United States Patent [19]

Gibbs

[11] 4,336,175

[45] Jun. 22, 1982

[54] POLYIMIDE PRECURSOR SOLUTIONS

[75] Inventor: Hugh H. Gibbs, Wilmington, Del.

[73] Assignee: E. I. Du Pont de Nemours and Company, Wilmington, Del.

[21] Appl. No.: 192,708

[22] Filed: Oct. 1, 1980

[51] Int. Cl.³ ............... C08K 5/05; C08K 5/34; C08K 5/06
[52] U.S. Cl. .................. 524/726; 528/183; 528/353; 524/761; 524/755; 524/765; 524/879
[58] Field of Search .......... 260/30.2, 33.2 R, 33.4 F; 528/183, 353

[56] References Cited

U.S. PATENT DOCUMENTS 3,649,601  3/1972  Critchley et al. ............. 528/353
3,789,048  1/1974  Incremona .................... 260/30.2
3,959,350  5/1976  Rogers ......................... 260/30.2

OTHER PUBLICATIONS

Chem. Abst., vol. 78, #85355c, Gibbs, "Composite Structures from Melt-Fusible Linear Polyimides . . . ", Ger. Off. 2,223,819.
Chem. Abst., vol. 83, #22 (180030e) "High Temperature Laminating Resins Based on Melt Fusible Polyimides", Gibbs et al.
Billmeyer, Textbook of Polymer Science, Interscience, New York, 1962, p. 250.
Blatz, NR-150, Polyimide Precursor Adhesive Solution Developed, Adhesives Age, Sep., 1978.

Primary Examiner—Herbert J. Lilling

[57] ABSTRACT

Stoichiometrically imbalanced solutions of 6FTA and aromatic diamine can be used to prepare laminates and bonded articles having a broad temperature range for consolidation.

5 Claims, 2 Drawing Figures

POLYIMIDE PRECURSOR SOLUTIONS

BACKGROUND OF THE INVENTION

Polyimide materials developed in recent years have found wide acceptance in applications requiring high thermal stability or chemical resistance. The polyimides are obtained by reacting specific tetracarboxylic acids or dianhydrides with diprimary diamines to obtain polyamide-acids which are converted to the corresponding polyimide.

Polyimides have been used as binders for laminar structures made up of the binder and a reinforcing agent such as a fiber or particulate filler. In the preparation of such laminar structures, a polyimide precursor solution is admixed with the reinforcing agent and then converted to the polyimide. One polyimide which can be used in this application is that prepared from the aromatic tetraacid 2,2-bis(3',4'-dicarboxyphenyl) hexafluoropropane (6FTA) and an aromatic diamine. In the preparation of the reinforced polyimide sheet or "laminate", the polyimide precursor solution of 6FTA, aromatic diamine and solvent is admixed with the reinforcing fiber or particulate filler and the polyimide precursor solution then converted to the final polymer form. At the same time, pressure is applied to the laminate to compact it and reduce the voids left by the removal of both the solvent and the water generated by the precursor conversion.

The timing of the compacting has, in the past, required very precise control. If the compaction pressure is applied too soon, unconverted binder solution will be squeezed out of the laminate. On the other hand, if the compaction pressure is applied too late in the conversion operation, the binder may have become too intractable to consolidate the laminate and reduce the void content with commercially feasible pressures. These considerations have previously limited the compaction temperature range of such laminates to a specific temperature plus or minus as little as five centigrade degrees for satisfactory results.

SUMMARY OF THE INVENTION

The instant invention provides an improved binder solution of 6FTA and aromatic diamines which markedly increases the temperature range over which a laminate of this binder and reinforcing filler can be compacted.

Specifically, the instant invention provides, in a solution of 2,2-bis(3',4'-dicarboxyphenyl) hexafluoropropane (6FTA), aromatic diamine and a solvent, the improvement wherein the 6FTA and aromaic diamine are present in quantities to provide a stoichiometric monomer imbalance of about from 2 to 9 mole percent, and the solvent is selected from the group consisting of lower alkanols of 1–4 carbon atoms, diglyme and mixtures of lower alkanol and diglyme with each other or with up to 50% by weight of N-methyl-2-pyrrolidone.

DETAILED DESCRIPTION OF THE INVENTION

Figure 1:
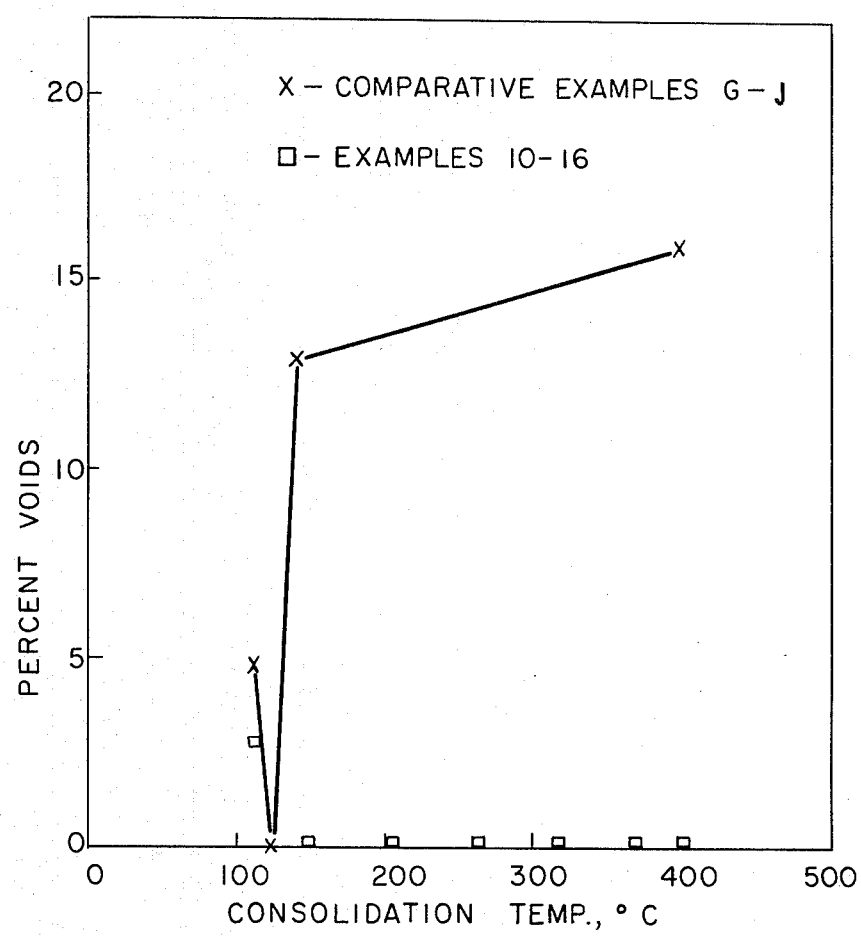

The instant invention is based on the discovery that, in solutions of 6FTA and an aromatic diamine, a monomer imbalance of about from 2 to 9 mole percent results in a binder solution which can be used to prepare outstanding laminates with a wide variety of reinforcing materials, and in which the range of temperatures which the laminate can be consolidated by pressure is significantly broader than solutions with stoichiometrally balanced amounts of 6FTA and aromatic diamine. While stoichiometry balanced solutions exhibit a narrow consolidation temperature range of as little as 10 centigrade degrees, laminates prepared from the present solutions can be consolidated over a temperature range of 100 centigrade degrees or more.

In the context of the present invention, 6FTA is understood to mean substantially pure 6FTA as well as the corresponding diester diacid of 6FTA and mixtures of the acid and the diester diacid. Aromatic diamines which can be used in the preparation of the present binder solution include aromatic primary diamines as disclosed, for example, in British Pat. No. 1,396,331, hereby incorporated by reference. Preferred diamines for use in the present binder solutions include para-phenylene diamine (PPD), meta-phenylene diamine (MPD), and 4,4'-oxydianiline (ODA).

The solvent used for the preparation of the binder solutions must be one in which the monomeric components are soluble. Solvents which can be used in the present invention include lower alkanols of 1-4 carbon atoms, diethylene glycol dimethyl ether (diglyme) and mixtures of lower alkanols and diglyme with each other or with up to 50% N-methyl-2-pyrrolidone (NMP). Of the lower alkanols, ethanol is preferred.

The binder solution can be prepared by admixture of the components according to normal techniques, adjusting the proportions of the monomeric components to provide a stoichiometric monomer imbalance of diamine and acid of about from 2 to 9 percent, preferably about from 3 to 8 percent. In general, it is preferred that the imbalance be provided by an excess of the acid component.

The reinforcing agents used in conjunction with the binder solution can be selected from a wide variety of fibers and particulate fillers including, for example, carbon fibers, glass fibers, boron fibers, aramid fibers, or metal fibers, asbestos, mica, graphite powder, or silicon carbide whiskers. The reinforcing agent can be used in amounts of up to about 70 volume percent, preferably about from 40 to 60 volume percent, based on the total volume of the structure.

The invention is further illustrated by the following specific examples:

In the Examples relating to the preparation and testing of a laminate, two types of laminates were prepared. The first type is a unidirectional laminate in which graphite fibers are laid on a release paper coated with high viscosity, high solids binder solution having a relatively low volatile concentration. Pressure is then applied to consolidate the fibers and the binder solution. In the second type of laminate, a graphite fabric is uniformly coated with binder solution and excess solvent is removed by heating to leave the fabric in a pliable condition with light tack. The impregnated unidirectional or fabric materials or "prepregs", respectively contain about 12 and 15 percent volatiles.

All laminates and bonded joints prepared in these Examples were made using vacuum bag molding techniques as described in H. H. Gibbs, *Processing of Composites Based on NR-150B2*, 10th National SAMPE Technical Conference, Kiamesha Lake, N.Y., Oct. 17, 1978, Vol. 10, page 211.

The void content of the products prepared in the Examples is measured by the techniques described in British Pat. No. 1,396,331, hereby incorporated by reference.

EXAMPLES 1–8 AND CONTROL EXAMPLES A–E

In Examples 1–8 and Control Examples A–E, fabric laminates were prepared by applying a solution to a graphite fabric, removing excess solvent as previously described, and molding the fabric laminate under pressure. The resulting laminate was then analyzed for void content and glass transition temperature of the polyimide binder. The composition of the binder solution, the molding conditions and the test results are summarized in Table I.

EXAMPLE 9 AND COMPARATIVE EXAMPLE F

The general procedure of Examples 1–8 was repeated, using a unidirectional prepreg tape instead of the graphite fabric used in Examples 1–8. Laminates were prepared and tested as before, and the results are summarized in Table II.

EXAMPLES 10–16 AND COMPARATIVE EXAMPLES G, H, I AND J

The general procedure of Example 9 was repeated, preparing unidirectional laminates. In Examples 10–16, the laminates were prepared using a binder solution of 6FTA/PPD/MPD in a ratio of 1.06/0.95/0.05, providing a 6 percent excess of the tetraacid component. In Comparative Examples G, H, I and J, the same components were used in a ratio of 1.00/0.95/0.05, providing a stoichiometrically balanced solution. Ethanol was the solvent in both cases.

The unidirectional laminates were treated at consolidation temperatures ranges of about from 110° to 371° C. The void content of the resulting laminates was measured, and the results of the testing are summarized in FIG. 1.

EXAMPLES 17–37 AND CONTROL EXAMPLES K–P

The general procedure of Examples 1 to 8 was repeated, using a variety of monomeric components and solvents.

In Examples 17–21, the binder solution was made up of 6FTA/PPD/MPD in a ratio of 1.06/0.95/0.05 in a solvent of ethanol and NMP.

In Examples 22–27 the binder solution was made up of 6FTA/PPD/MPD in a ratio of 1.06/0.95/0.05 in an ethanol solvent.

In Examples 28–32, the binder solution was made up of 6FTA/PPD in a ratio of 1.03/1 in an ethanol solvent.

In Examples 33–37, the binder solution was made up of 6FTA/PPD/MPD in a ratio of 1.03/0.95/0.05 in an ethanol/NMP solvent.

In Comparative Examples K–P a stoichiometrically balanced monomer solution of 6FTA/PPD/MPD in a ratio of 1.0/0.95/0.05 and an ethanol solvent was used.

Figure 2:
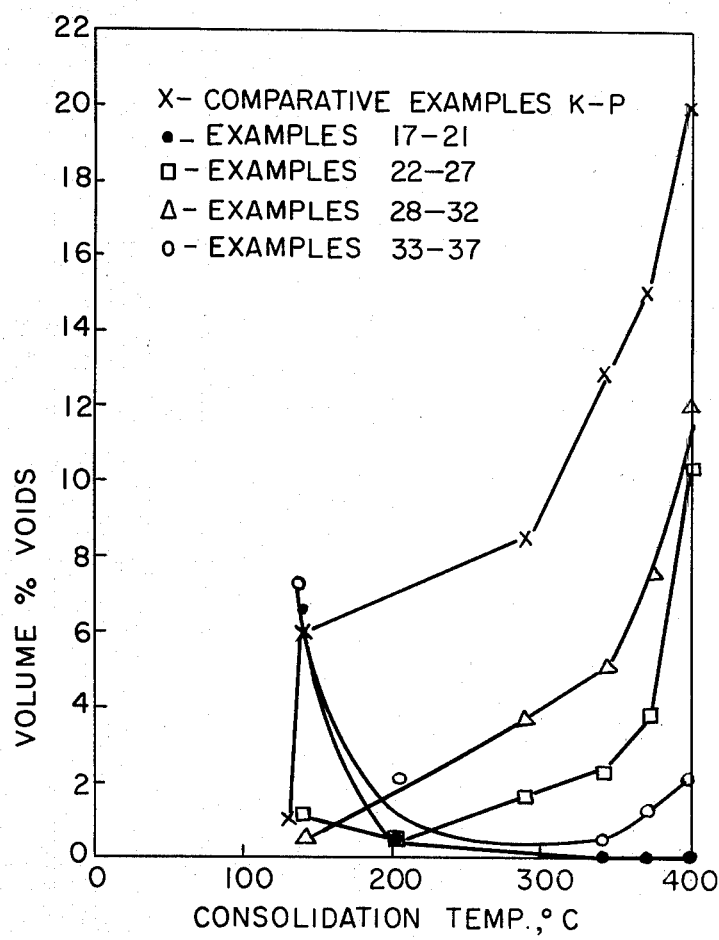

The laminated fabrics were consolidated at various consolidation temperatures and examined for void content. The results of the analysis are summarized in FIG. 2, and indicate that the imbalanced monomer solutions of the instant invention provide a substantially lower void content at a significantly wider range of consolidation temperatures.

EXAMPLES 40–44 AND CONTROL EXAMPLES Q–S

In Control Examples Q–T, various monomer solutions were tested for adhesive capability by bonding titanium coupons. Titanium coupons measuring 1 inch by 4 inches by 0.05 inch were sand blasted, cleaned in an ultrasonic bath using fluorocarbon solvent, treated for one hour at 95° C. with an alkaline etching solution, rinsed with 60° tap water, 5% room temperature nitric acid, room temperature deionized water and, finally, 90° C. deionized water. The coupons were then dried for one half hour at 90° C.

Immediately after drying, adhesive formulations, as summarized in Table III, additionally containing atomized aluminum powder equivalent to 30 weight percent based on the cured resin solids, was applied. A piece of glass fabric was placed on the primed area of one of the coupon surfaces. Adhesive solution was applied to thoroughly wet the fabric and to provide a final cured bond line thickness, including the glass fabric, of 5 to 10 mils.

Excess solvent was removed by placing the coated coupons face up in an oven and heating to the final "B" staging temperature at a rate of 2° C. per minute. On reaching this temperature, the samples were immediately cooled.

The coated coupons were held in alignment with a ½ inch overlap of the areas to be bonded. Before bonding, the adhesive coatings were substantially completely cured, containing 0.4% volatiles or less. The coupons were bonded at the temperatures pressures and for the periods summarized in Table III and cooled under pressure. The indicated molding temperature was applied by heating at 2° C. per minute, followed by holding for the specified period at the final molding temperature under pressure. The bonding operation was carried out under vacuum to remove volatiles.

The lap strength of the resulting bonded joints is determined and summarized in Table III.

TABLE I

| MOLDING STUDIES ON FABRIC LAMINATES | | | |
|---|---|---|---|
| Example | Control A | 1 | Control B |
| Monomers | 6FTA/PPD/MPD | 6FTA/PPD/MPD | 6FTA/PPD/MPD |
| Mole Ratios | 1.00/0.95/0.05 | 1.06/0.95/0.05 | 1.00/0.95/0.05 |
| Solvent | Ethanol | Ethanol | 3:1 Ethanol/NMP* |
| Consolidation Temp., °C. | 204 | 204 | 204 |
| Final Molding Conditions | 2 hrs/ 400° C./200 psi | 2 hrs/ 400° C./200 psi | 2 hrs/ 400° C./200 psi |
| d., g/cc | 1.46 | 1.57 | 1.53 |
| Wt. % Resin | 40 | 43 | 38 |
| Vol. % | | | |

TABLE I-continued
MOLDING STUDIES ON FABRIC LAMINATES

| | | | |
|---|---|---|---|
| Fibers Vol. % | 50 | 51 | 54 |
| Voids | 10 | <1 | 4 |
| Tg. °C. | 364 | 360 | 372 |

| Example | | | |
|---|---|---|---|
| Monomers | 2 | 3 | 4 |
| Mole | 6FTA/PPD/MPD | 6FTA/PPD/MPD | 6FTA/PPD/MPD |
| Ratios | 1.06/0.95/0.05 | 1.08/0.95/0.05 | 1.00/1.026/0.054 |
| Solvent | 3:1 Ethanol/NMP | Ethanol | Ethanol |
| Consolidation Temp., °C. | 204 | 371 | 371 |
| Final Molding Conditions | 2 hrs/ 400° C./200 psi | 2 hrs/ 400° C./200 psi | 2 hrs/ 400° C./200 psi |
| d., g/cc | 1.59 | 1.56 | 1.60 |
| wt. % Resin | 37 | 38 | 39 |
| Vol. % Fibers | 57 | 55 | 56 |
| Vol. % Voids | <1 | 2 | <1 |
| Tg. °C. | 350 | 326 | 318 |

| Example | | Control | |
|---|---|---|---|
| Monomers | 5 | C | 6 |
| Mole | 6FDE/PPD | 6FTA/PPD/ODA | 6FTA/PPD/ODA |
| Ratios | 1.06/1.00 | 1.00/0.75/0.25 | 1.00/0.75/0.25 |
| Solvent | Ethanol | Diglyme | Diglyme |
| Consolidation Temp., °C. | 371 | 343 | 343 |
| Final Molding Conditions | 2 hrs/ 400° C./200 psi | 4 hrs/ 371° C./200 psi | 4 hrs/ 371° C./200 psi |
| d., g/cc | 1.58 | 1.50 | 1.58 |
| wt. % Resin | 39 | 37 | 40 |
| Vol. % Fibers | 55 | 53 | 54 |
| Vol. % Voids | <1 | 7 | 1 |
| Tg. °C. | 357 | 341 | 318 |

| Example | Control | | Control | |
|---|---|---|---|---|
| Monomers | D | 7 | E | 8 |
| Mole | 6FTA/ODA | 6FTA/ODA | 6FTA/MPD | 6FTA/MPD |
| Ratios | 1.00/1.00 | 1.06/1.00 | 1.00/1.00 | 1.06/1.00 |
| Solvent | Ethanol | Ethanol | Ethanol | Ethanol |
| Consolidation Temp., °C. | 316 | 316 | 316 | 316 |
| Final Molding Conditions | 4 hrs/ 343° C./ 200 psi | 4 hrs/ 343° C./ 200 psi | 4 hrs/ 316° C./ 200 psi | 4 hrs/ 316° C./ 200 psi |
| d., g/cc | 1.51 | 1.56 | 1.55 | 1.60 |
| wt. % Resin | 41 | 40 | 42 | 40 |
| Vol. % Fibers | 51 | 54 | 52 | 54 |
| Vol. % Voids | 5 | 1 | 3 | <1 |
| Tg, °C. | 317 | 296 | 291 | 275 |

*By weight

TABLE II
MOLDING STUDIES ON UNIDIRECTIONAL LAMINATES

| EXAMPLE | 9 | F |
|---|---|---|
| MONOMERS | 6FTA/PPD/MPD | 6FTA/PPD/MPD |
| MOLE RATIOS | 1.06/0.95/0.05 | 1.00/0.95/0.05 |
| SOLVENT | ETHANOL | ETHANOL |
| Consolidation Temp., °C. | 400 | 400 |
| Final Molding Conditions | 2 hrs/400° C./ 200 psi | 2 hrs/400° C./ 200 psi |
| d., g/cc | 1.62 | 1.36 |
| wt. % Resin | 40 | 39 |
| Vol. % Fibers | 56 | 47 |
| Vol. % Voids | <1 | 16 |
| Tg. °C. | 334 | 360 |

TABLE III

MOLDING STUDIES ON TITANIUM/TITANIUM LAP JOINTS

| Example Monomers Mole Ratios Solvent | Q<br>6FTA/PPD/MPD<br>1.00/0.95/0.05<br>3:1 Ethanol/NMP | Example 40<br>6FTA/PPD/MPD<br>1.06/0.95/0.05<br>3:1 Ethanol/NMP | Control R<br>6FTA/PPD/MPD<br>1.00/0.95/0.05<br>Ethanol | 41<br>6FTA/PPD/MPD<br>1.06/0.95/0.05<br>Ethanol |
|---|---|---|---|---|
| "B"-Staging Temp. °C. | 371 | 371 | 371 | 371 |
| Final Bonding Conditions | 4 hrs/ 371° C./200 psi | 4 hrs/ 371° C./200 psi | 4 hrs/ 371° C./200 psi | 4 hrs/ 371° C./200 psi |
| Lap Shear Strength, psi(23° C.) | 60 | 998 | 362 | 976 |
| Example Monomers Mole Ratios Solvent | 42<br>6FTA/PPD/MPD<br>1.08/0.95/0.05<br>Ethanol | 43<br>6FTA/PPD/MPD<br>1.00/1.026/0.054<br>Ethanol | Control S<br>6FTA/PPD/ODA<br>1.00/0.75/0.25<br>Diglyme | 44<br>6FTA/PPD/ODA<br>1.06/0.75/0.25<br>Diglyme |
| "B"-Staging Temp. °C. | 371 | 371 | 371 | 371 |
| Final Bonding Conditions | 4 hrs/ 371° C./200 psi | 4 hrs/ 371° C./200 psi | 4 hrs/ 371° C./200 psi | 4 hrs/ 371° C./200 psi |
| Lap Shear Strength, Psi(23° C.) | 1890 | 613 | 550 | 1450 |

I claim:

1. In a solution of 2,2-bis(3',4'-dicarboxyphenyl) hexafluoropropane (6FTA), aromatic diamine and a solvent, the improvement wherein the 6FTA and aromatic diamine are present in quantities to provide a stoichiometric monomer imbalance of about from 2 to 9 mole percent, and the solvent is selected from the group consisting of lower alkanols of 1-4 carbon atoms, diglyme and mixtures of lower alkanol and diglyme with each other or each with up to 50% by weight of N-methyl-2-pyrrolidone.

2. A solution of claim 1 wherein the monomer imbalance is about from 3 to 8 percent.

3. A solution of claim 1 wherein the solvent consists of ethanol.

4. A solution of claim 1 wherein the solvent consists of diglyme.

5. A solution of claim 1 wherein the solvent consists of a mixture of ethanol and up to 50% by weight of N-methyl-2-pyrrolidone.

* * * * *